April 11, 1950     C. M. LEE     2,503,750
END PLAY ELIMINATING MEANS FOR LENS TUBES
Filed Aug. 13, 1947
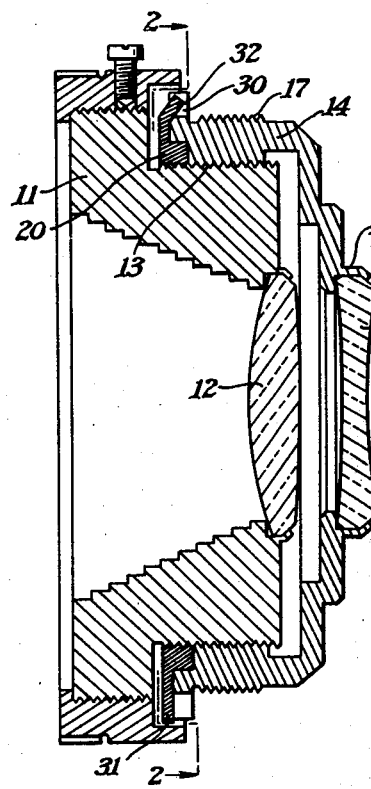
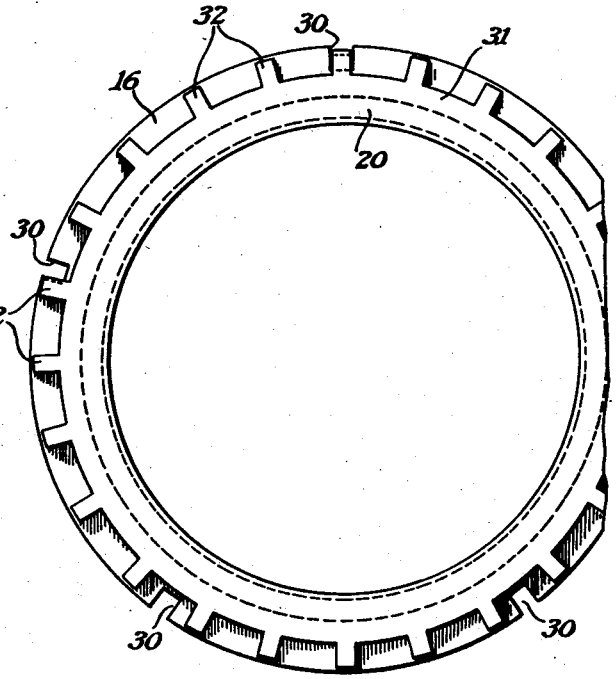
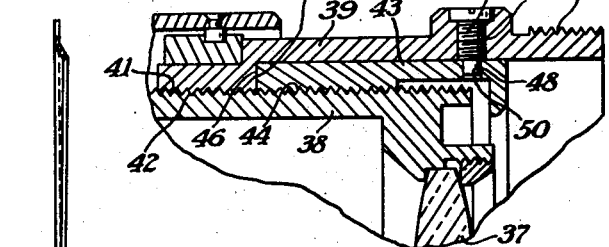
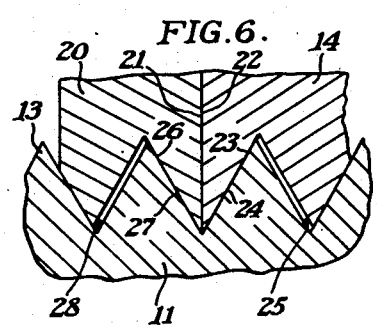
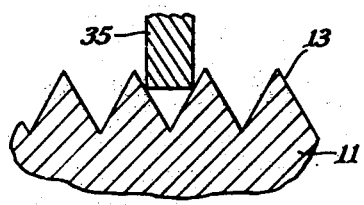
CHARLES M. LEE
INVENTOR
BY
ATTORNEYS Patented Apr. 11, 1950

2,503,750

UNITED STATES PATENT OFFICE 2,503,750

END PLAY ELIMINATING MEANS FOR LENS TUBES

Charles M. Lee, Rochester, N. Y., assignor to Eastman Kodak Company, Rochester, N. Y., a corporation of New Jersey Application August 13, 1947, Serial No. 768,351

15 Claims. (Cl. 88—57)

The present invention relates to photography, and more particularly to a lens mount primarily designed for use on a camera.

In many cameras, focusing is accomplished by moving one or more of the lens cells axially relative to the mount. Such movement may be accomplished by merely sliding the movable cell in and out of the mount. However, in the better types of cameras, the movable cell is spirally moved by means of a threaded connection between the cell and the mount. For obvious reasons, it is desirable that the play or back-lash be eliminated in the threaded connection; but, as is well known, it is quite difficult and costly to make such a connection which is free from end play but which will permit the ready and easy movement of the cell for focusing.

The present invention has as its principal object the provision of an end play eliminating means which effectively removes the end play but permits freedom of movement of the focusing member.

A further object of the invention is the provision of an end play eliminating mechanism which is simple, rugged, of few parts, and highly effective in use.

Yet another object of the invention is the provision of a novel arrangement for connecting the parts of the end play eliminating mechanism when in adjusted position.

To these and other ends, the invention resides in certain improvements and combination of parts, all as will be hereinafter more fully described, the novel features being pointed out in the claims at the end of the specification.

In the drawings:

Figure 1 is a longitudinal sectional view through a portion of a lens mount showing an end play eliminating device constructed in accordance to one embodiment of the invention;

Figure 2 is a transverse sectional view through the mount illustrated in Figure 1 and taken substantially on line 2—2 thereof, showing the novel means for connecting the parts of the end play eliminating device;

Figure 3 shows a modified form of lock ring used with the end play eliminating device of the present invention;

Figure 4 is an enlarged longitudinal sectional view through a portion of a lens mount, showing the relation of the ring of Figure 3 with the threads of the movable lens cell;

Figure 5 is a partial longitudinal sectional view through a lens mount, showing a modified end play eliminating device arranged for holding the parts in adjusted relation;

Figure 6 is a partial longitudinal view through the mount showing the relation of the end play eliminating means to the thread of the movable lens cell, showing the manner in which end play is eliminated, yet permitting freedom of movement of the adjustable lens cell for focusing.

Similar reference numerals throughout the various views indicate the same parts.

As the present invention relates only to a mechanism for eliminating end play in the threaded connection along which the movable focusing lens cell or cells move, only so much of the lens mount will be illustrated and described as will be necessary to a full and complete understanding of the present invention. As the mechanism of the present invention can be used with a wide variety of lens mounts, the mount constructions shown herein are merely illustrative and not intended as limitations.

Figure 1 shows one embodiment of an end play eliminating means used in connection with a mount of the type in which focusing is accomplished by movement of the front lens cell only. As such forms of focusing mechanisms are old and well known, details thereof are not shown. Suffice it to say that the front lens cell 11 carries a front lens 12 and is provided with an external thread 13 which engages a corresponding thread on an annular part or member 14, to be hereinafter more fully described, to provide a threaded connection with the mount so that the front cell 11 and lens 12 may be moved axially relative to the other lenses, only one of which is shown at 15, to focus the mount. The lens 15 is mounted in a cell 16 which is preferably, but not necessarily, connected to or formed integral with the annular member 14. It is contemplated, however, that the cell 16 may be connected to the mount separately from the member 14. The latter is provided with an external thread 17 by which the member 14 and cell 16 may be secured in position in the mount. It is thus apparent, from an inspection of Figure 1, that the member 14 provides a support for the focusing cell 11 which is moved in and out of the mount along the threaded connection between the cell 11 and member 14.

In cameras of this type, particularly high grade cameras, it is desirable to have a threaded connection for the mount 11 which is free from end-play or back-lash so as to secure accurate positioning of the mount, as will be readily apparent to those familiar with the art. However, it is quite difficult as well as costly to provide such a threaded connection which is free from back-lash. The present invention overcomes this difficulty by providing an adjustable member which cooperates with the cell supporting member 14 to eliminate effectively any back-lash or end-play between the cell and its supporting member 14, yet permitting the cell to be easily and readily screwed in and out of the member 14 for focusing.

To secure this result, the threaded portion 13 of the cell 11 has positioned thereon an annular axially adjustable member or ring 20 which engages the thread 13 of cell 11 over a number of threads, as clearly illustrated in Figure 1. In assembling, the supporting member 14, with the cell 16 and lens 15, is screwed into the mount until the lens 15 is properly positioned. The cell 11, with the ring 20 positioned thereon, is then screwed into the member 14 by reason of the thread 13 and the corresponding thread of the member 14. The ring 20 is then moved to the right along the thread 13 until the right face 21 of the ring abuts and tightly presses against an aligned face 22 formed on the left end of the member 14. The parts are then in the position shown in Figure 6. In this position, the ring 20 and part 14 press against each other so that the ring 20 urges member 14 to the right to cause the right face 23 of each thread thereon to engage tightly with the right face 24 of each of the threads 13, see Figure 6, thus leaving any thread play between threads at the left face as shown at 25. On the other hand, the member 14 reacts on the ring 20 and causes the left face 26 of each thread on ring 20 to tightly engage and wedge against the corresponding face 27 of the thread 13, see Figure 6, leaving any play between the ring 20 and mount 11 at the left threaded face, as shown at 28.

Thus the member 14 and ring 20 are forced in opposite direction and into engagement with opposite faces of the thread 13 so as to effectively remove any end play in the threaded connection, yet permitting complete freedom of movement of the cell 11 along the threaded connection for focusing. The member 14 is provided with an annular portion which overhangs the ring 20 and has the periphery thereof formed with a plurality, in the present instance five, of spaced open end slots or notches 30. The ring 20 is provided with a radially extending rib or plate 31, the periphery of which is formed with a plurality of teeth or lugs 32. When the ring 20 has been screwed into abutting relation with the member 14, as shown in Figures 1 and 6, one of the lugs 32 will register with one of the notches 30, and this registering tooth is then bent over, as shown in Figures 1 and 2, so as to extend into the notch 30 to connect the ring 20 to the member 14 to hold the parts in unitary adjusted position to eliminate end play in the threaded connection. The threads on the ring 20 are the same pitch as the threads 13 and the corresponding threads on the part 14, and when the ring 20 and member 14 are connected, as shown in Figure 1 and above described, the two parts form in effect a single unitary support for the cell 11 and provides a threaded connection on which the cell may be moved for focusing. Thus the support for the lens 11 also provides means for eliminating back-lash or end-play in the threaded connection.

In order to secure the desired result, a novel arrangement of lugs and notches are provided, as shown in Figure 2, the member 14 being formed with five notches 30 and the plate 31 having a large number of teeth or lugs 32. However, the number of teeth or lugs 32 is of such a number as not to be evenly divisible by the number of notches 30 so that a vernier effect is secured. The result is that when the ring 20 has been moved to its proper position to engage member 14, only one tooth 32 will be in exact registry, or relatively close to such registry, with one of the notches 30 so that the engagement of ring 20 to member 14 by the inter-engaging of the lugs 32 and the registering of notch 30 can be secured without destroying or reducing the effectiveness of the end-play eliminating feature, the advantage of which will be readily apparent.

In the arrangement shown in Figure 1, and above described, the ring 20 has a length equal to several of the threads 13. A modified ring structure 35, as shown in Figures 3 and 4, is made from an annular sheet of metal or similar material which has a thickness which is substantially less than and about half the pitch of thread 13, as clearly illustrated in Figure 4. This ring 35 is deformed so as to have an axial dimension which is equal only to the pitch of the thread 13 so that it engages only a single thread. This modified ring 35 is threaded on to the thread 13 and is adjustable to cooperate with the member 14 in the same manner as the above-described ring 20 to remove end-play in the threaded connection. The ring 35 is, however, much thinner than the ring 20 and extends only along a single thread of the threads 13.

The locking rings 20 and 35, as shown, are made preferably of metal. It is contemplated, however, that these rings may be made of a plastic material so that when a heated member is applied to the projecting teeth 32 the latter may be bent over so as to engage in the notches 30, otherwise the parts are the same as those described in connection with the rings 20 and 35.

Figure 5 shows a modified end-play eliminating mechanism for use in the type of lens mount in which an inner lens barrel, with the various lens elements, is moved for focusing. In this embodiment, the various lens elements, only one of which is shown at 37, Figure 5, are mounted in a lens barrel 38 which is axially movable relative to the mount to move all the lens elements as a unit for focusing. Means, not shown, is connected to the lens barrel to rotate the latter. An annular member or sleeve 39 has an end thereof provided with an external thread 40 for connecting the member in fixed position in the mount. The other end of the member 39 is formed with an internal thread 41 which engages an external thread 42 of corresponding pitch on the barrel 38 to provide a threaded connection between the barrel and the member, as clearly illustrated at Figure 5. The member 39 corresponds with the member 14, Figure 1, and serves both to support the movable lens barrel 38, and cooperates therewith to provide the threaded connection used for moving the barrel axially for focusing.

In order to eliminate back-lash or end-play in the threaded connection, the embodiment shown in Figure 5 provides an annular member, ring, or sleeve 43 which is positioned within and concentric with the fixed member 39. The left end of ring 43 is provided with an internal threaded portion 44 which is the same pitch as and which engages the thread 42 on the lens barrel 38. When the ring 43 is screwed to the left along the thread 42, the left end 45 of the ring will abut a shoulder 46 formed on the fixed member 39 adjacent threaded portion 41 thereof. Thus, when the fixed member 39 and adjustable ring 43 are in this position, the parts tend to force each other in opposite directions, in a manner similar to the parts illustrated in Figure 6, to take up any end-play or back-lash between the thread 42 and threads 41 and 44. When the member 39 and ring 43 are in adjusted position to eliminate back-lash or end-play, radially aligned holes 47 and 48 may be drilled into the member 39 and ring 43 respectively. A screw 49 is then threaded into the hole 47 of the fixed member 39 and has a portion 50 which extends into the hole 48 of the ring to connect the member 39 and ring 43 to form a unitary structure which serves both to support the lens barrel 38 and also to provide a thread along which the barrel may be moved for focusing. Thus the ring 43 may be broadly considered with the fixed member 39 as a support for the barrel 38. Also member 39 and ring 43 eliminate back-lash or end-play between the barrel and its support.

While certain embodiments of the invention have been disclosed, it is to be understood that the inventive idea may be carried out in a number of ways. This application is, therefore, not to be limited to the precise details described, but is intended to cover all variations and modifications thereof falling within the scope of the appended claims.

I claim:

1. In a lens mount, the combination with an externally threaded lens carrying tube adapted to be moved axially of said mount for focusing, of a pair of threaded tube-supporting members positioned in said mount and engaging the thread of said tube, said member being movable relatively along the thread of said tube and into engaging cooperating relation to take out end-play between said threads, and means on said members for connecting said members in adjusting position.

2. In a lens mount, the combination with an externally threaded lens carrying tube adapted to be moved axially of said mount for focusing, of a support for said tube positioned in said mount, said support comprising a pair of members formed with threads which engage and along which the thread of the tube moves when focusing, said members being adjustable relatively along the thread of said tube to take out end-play between the threads of the tube and members, and means formed from said members independent of said threads for connecting the members in adjusted position.

3. In a lens mount, the combination with an externally threaded lens carrying tube adapted to be moved axially of said mount for focusing, of a member secured in position in said mount and supporting said tube, a thread formed on said member and engaging the thread of said tube to provide a threaded connection by which said tube may be moved, relative to said member for focusing, a threaded ring concentric with said member engaging the thread of said tube and movable therealong and into abutting cooperating relation with said member to take out end-play in said threaded connection, and locking means independent of said threads for connecting said ring and member after adjustment.

4. In a lens mount, the combination with an externally threaded lens carrying tube adapted to be moved axially of said mount for focusing, a support for said tube positioned in said mount and formed with a thread which is engaged by and along which the thread of said tube is moved during focusing, said support comprising a member fixedly positioned in said mount, and a ring concentric with and adjustable relative to said fixed member and engaging and cooperating therewith to take out end-play in the threaded connection between said tube and support, and locking means separate from said threads for connecting said ring to said member after adjustment.

5. In a lens mount, the combination with an externally threaded lens carrying tube adapted to be moved axially of said mount for focusing, a support for said tube positioned in said mount and formed with a thread which is engaged by and along which the thread of said tube is moved during focusing, said support comprising a member fixedly positioned in said mount, and a ring threadedly engaging said tube and adjustable therealong and into abutting relation with said member and cooperating with the latter to urge said member and ring into holding relation with opposite sides of the thread of said tube to take out end-play between said tube and support, and means for connecting said ring to said member at its periphery after adjustment.

6. In a lens mount, the combination with an externally threaded lens carrying tube adapted to be moved axially of said mount for focusing, of a member secured in position in said mount and supporting said tube, a thread formed on said member and engaging the thread of said tube to provide a threaded connection by which said tube may be moved relative to said member for focusing, a threaded ring carried by said tube and adjustable relatively thereto so as to be moved into tight contacting relation with said member to cooperate therewith to take out end-play in said threaded connection, and means cooperating with engaging members formed on and connecting said ring to said member after adjustment to form therewith a unitary threaded support for said tube.

7. In a lens mount, the combination with an externally threaded lens carrying tube adapted to be moved axially of said mount for focusing, of a support for said tube positioned in said mount, said support comprising a pair of concentric members formed with threads which engage and along which the thread of the tube moves when focusing, said members being positioned in tight abutting relation so as to press axially against opposite sides of the thread of said tube to take out end-play between the threads of said tube and support but to permit said tube to move freely along the threads of said support for focusing movement, and interlocking means on said members for connecting said members in said abutting relation.

8. In a lens mount, the combination with an externally threaded lens carrying tube adapted to be moved axially of said mount for focusing, of a support for said tube positioned in said mount, said support comprising a pair of concentric members formed with threads which engage and along which the thread of the tube moves when focusing, said members being adjustable along said tube and into tight abutting relation to move the thread of one member axially and into engagement with one side of the thread of said tube to move the thread of the other member axially and into engagement with the other side of the tube thread, said engagements serving to take out end-play between the threads of said tube and support but to permit movement of said tube relative to said support for focusing, and means formed on said members for connecting said members in said engaging relation.

9. In a lens mount, the combination with an externally threaded lens carrying tube adapted to be moved axially of said mount for focusing, of a pair of threaded tube-supporting members positioned in said mount and engaging the thread of said tube, said members being movable relatively along the thread of said tube and into cooperating relation to take out end-play between said threads, and vernier means formed from said members for connecting said members in adjusted position.

10. In a lens mount, the combination with an externally threaded lens carrying tube adapted to be moved axially of said mount for focusing, of a pair of threaded tube-supporting members positioned in said mount and engaging the thread of said tube, said members being movable relatively along the thread of said tube and into cooperating relation to take out end-play between said threads, one of said members being formed with a plurality of peripheral notches, and peripheral teeth formed on the other of said members, one of said teeth being bendable into one of said notches to connect said member.

11. In a lens mount, the combination with an externally threaded lens carrying tube adapted to be moved axially of said mount for focusing, of a pair of threaded tube-supporting members positioned in said mount and engaging the thread of said tube, said members being movable relatively along the thread of said tube and into cooperating relation to take out end-play between said threads, one of said members being formed with a plurality of peripheral notches, and peripheral teeth formed on the other of said members, the number of teeth being such as not to be evenly divisible by the number of notches so as to provide a vernier effect between said teeth and notches so that when the members are adjusted only one tooth and notch will be in registry, the tooth being bent into the registering notch to connect the members.

12. In a lens mount, the combination with an externally threaded lens carrying tube adapted to be moved axially of said mount for focusing, of a member secured in position in said mount and supporting said tube, a thread formed on said member and engaging the thread of said tube to provide a threaded connection by which said tube may be moved relative to said member for focusing, a ring threadedly engaging the said tube and movable into engaging relation with said member to cause the threads of said member and ring to engage opposite faces of the thread of said tube to take end-play out of said threaded connection, said member being formed with a plurality of spaced peripheral notches, and a plurality of peripheral teeth formed on said ring, the number of teeth being such as not to be evenly divisible by the number of notches so as to provide a vernier effect between said teeth and notches so that when said member and ring are in engaging relation only one tooth and notch will be in registry, the tooth being bent into the registering notch to connect said member to retain them in engaging relation.

13. In a lens mount, the combination with an externally threaded lens carrying tube adapted to be moved axially of said mount for focusing, of a member secured in position in said mount and supporting said tube, a thread formed on said member and engaging the thread of said tube to provide a threaded connection by which said tube may be moved relative to said member for focusing, a threaded ring carried by said tube and movable into engaging relation with said member and cooperating therewith to take out end-play in said threaded connection, said ring having a thickness substantially equal to half the pitch of the thread of said tube, and means for connecting said ring to said member.

14. In a lens mount, the combination with an externally threaded lens carrying tube adapted to be moved axially of said mount for focusing, of a member secured in position in said mount and supporting said tube, a thread formed on said member and engaging the thread of said tube to provide a threaded connection by which said tube may be moved relative to said member for focusing, a threaded ring carried by said tube and movable into engaging relation with said member and cooperating therewith to take out end-play in said threaded connection, said ring being formed from sheet material of a thickness substantially equal to half the pitch of the thread of said tube and having a thread length of one pitch, and means carried by said ring for connecting the latter in adjusted relation with said member.

15. In a lens mount, the combination with an externally threaded lens carrying tube adapted to be moved axially of said mount for focusing, of a member secured in position in said mount and supporting said tube, a thread formed on said member and engaging the thread of said tube to provide a threaded connection by which said tube may be moved relative to said member for focusing, a threaded ring carried by said tube and movable into engaging relation with said member and cooperating therewith to take out end-play in said threaded connection, said ring being formed from sheet material of a thickness substantially equal to half the pitch of the thread of said tube and having a thread length of one pitch, said member being formed with a plurality of spaced peripheral notches, and a plurality of bendable teeth formed on the periphery of said ring, the number of teeth being such as not to be evenly divisible by the number of said notches so as to provide a vernier effect between said teeth and notches when said ring engages said members to position only a single notch and tooth in registry, the tooth being bent into the registering notch to connect the ring and member in adjusted relation.

CHARLES M. LEE.

REFERENCES CITED

The following references are of record in the file of this patent:

UNITED STATES PATENTS

| Number | Name | Date |
| --- | --- | --- |
| 627,206 | Richardson | June 20, 1899 |
| 1,835,503 | Lemke | Dec. 8, 1931 |
| 1,848,402 | Wollensak | Mar. 8, 1932 |
| 1,880,635 | Wollensak | Oct. 4, 1932 |
| 2,026,724 | Wollensak | Jan. 7, 1936 |
| 2,101,476 | Peterson | Dec. 7, 1937 |
| 2,143,813 | Wood | Jan. 10, 1939 |
| 2,245,241 | Wood | June 10, 1941 |
| 2,271,227 | Lee | Jan. 27, 1942 |
| 2,410,704 | Bouchard | Nov. 5, 1946 |
| 2,432,479 | Lee | Dec. 9, 1947 |